No. 723,040. PATENTED MAR. 17, 1903.
C. SCHMITZ.
MANOMETRIC GAGE.
APPLICATION FILED DEC. 2, 1901.
NO MODEL. 2 SHEETS—SHEET 1.
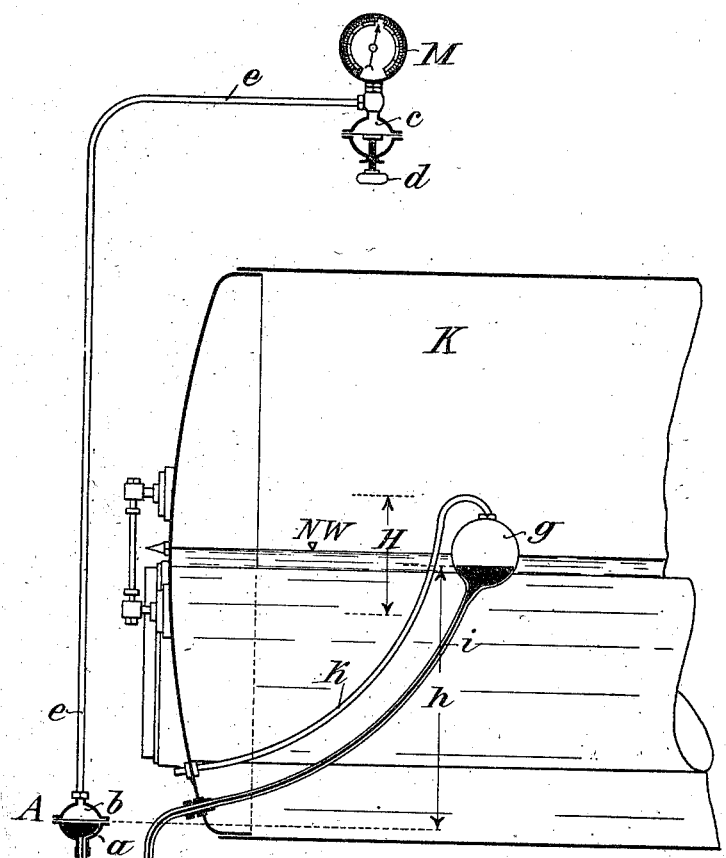
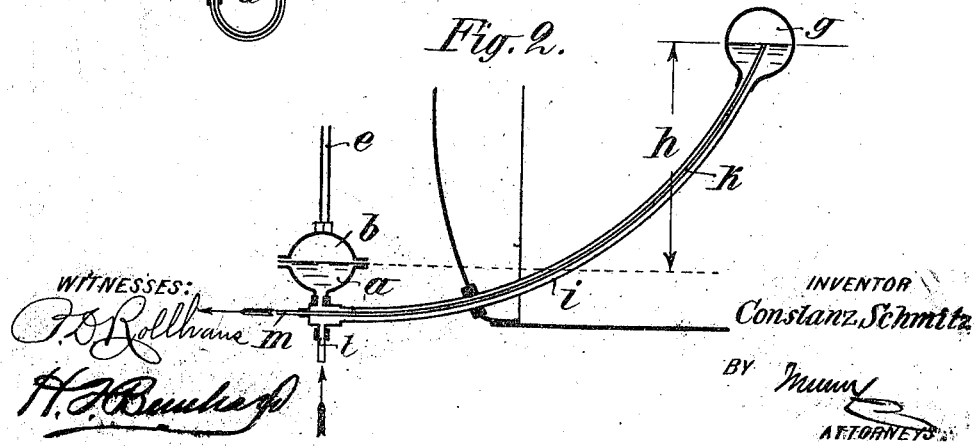
WITNESSES:
INVENTOR
Constanz Schmitz
BY
ATTORNEYS

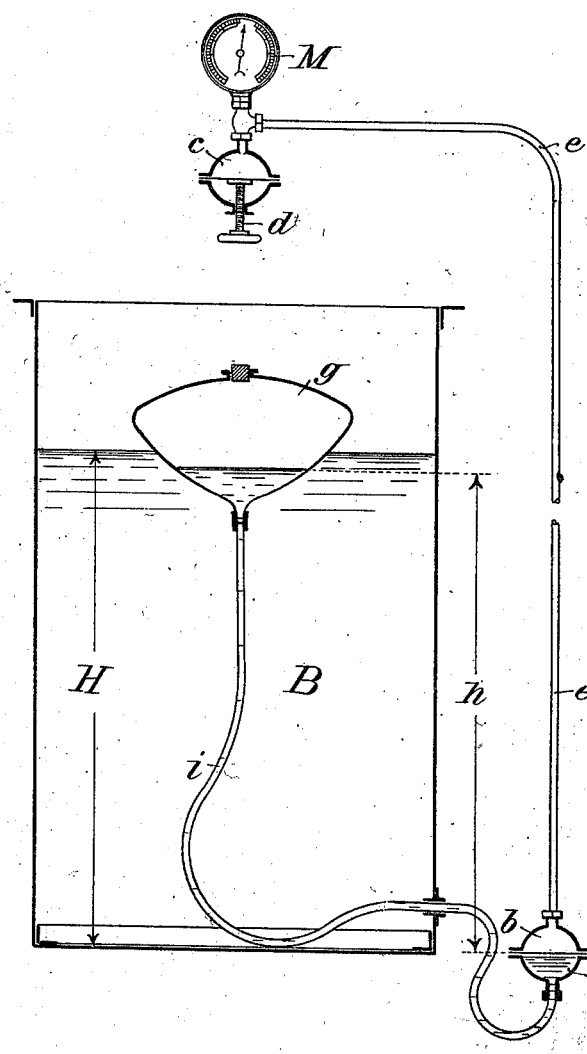

UNITED STATES PATENT OFFICE.

CONSTANZ SCHMITZ, OF BERLIN, GERMANY.

MANOMETRIC GAGE.

SPECIFICATION forming part of Letters Patent No. 723,040, dated March 17, 1903.

Application filed December 2, 1901. Serial No. 84,337. (No model.)

*To all whom it may concern:*

Be it known that I, CONSTANZ SCHMITZ, engineer, a subject of the King of Prussia, German Emperor, residing at 5 Calvin street, Berlin, N. W., German Empire, have invented certain new and useful Improvements in Liquid-Level Indicators, of which the following is a specification.

For gaging the height of a liquid-level it was usual heretofore to indicate the level of the liquid contained in a receptacle by means of a glass gage or by transmitting the pressure caused by the liquid itself to a manometric gage. In the first case when the receptacle is under pressure—as, for instance, in steam-generators—there is always the danger that the glass may burst or the passages may become obstructed, so that the device gives wrong indications. In the second case the instruments give correct indications as long as water is used; but as soon as the specific gravity of the liquid changes the graduation of the manometric indicating the height and being meant for water only does not correspond with the actual level of the liquid. In order to render the indications in such instruments independent of the inner pressure of the receptacle and of the specific gravity of the liquid the level of which is to be measured, the height of the liquid is to be determined by the pressure of a liquid column, which is inclosed in a suitable appliance, and thus rendered invariable. For this purpose liquids such as oil, alcohol, mercury, or the like are used.

The invention is illustrated in the accompanying drawings, in which similar letters denote similar parts, and in which—

Figures 1 to 3, inclusive, show various embodiments of the invention in diagrammatical forms.

In Fig. 1 a device is illustrated by which the level of the water within a steam-boiler K, being under steam-pressure, can be gaged. On the water-surface floats a hollow receptacle $g$, of metal, for instance, and sufficiently strong to stand the pressure and which has attached to it a narrow flexible tube $i$, passing through the wall of the boiler and connected to the lower space $a$ of a pressure-transmitting apparatus A. The space $a$, the tube $i$, and part of the hollow float $g$ are filled with one of the above-named liquids—as, for instance, mercury. To prevent a dangerous rise of pressure within the float $g$ by the heat within the boiler, the upper part of this float is preferably provided with a tube $k$ to communicate with the atmosphere, so that the pressure in the receptacle $a$ exactly corresponds to the height $h$ of the inclosed liquid column. The second tube $k$ may also be arranged in the interior of the tube $i$, as shown in Fig. 2. In order to allow of filling the float with such liquids as will boil at the temperature of the surrounding hot liquids—as, for instance, in steam-boilers—the liquid is introduced in a continuous current from the side into the bottom part of the tube $i$, Fig. 2. The inner tube $k$ extends into the float only to such height as corresponds to the level it is desired to maintain therein, so that it will act as an overflow for the liquid introduced through this tube $k$, and thus the liquid column will never rise beyond the overflow-tube. Owing to the fact that fresh liquid is continuously introduced in sufficient quantities the same is prevented from boiling within the interior of the apparatus, thus always maintaining atmospheric pressure within the latter. The pressure is transmitted by a diaphragm to the upper space $b$ of the receptacle A, which is filled with air or similar fluid. By this medium the pressure is transmitted through a tube $e$ to a manometric gage M, the graduation of the latter being such that variations of the water-level between the limits of H are indicated. $c$ is an enlargement underneath the manometric gage and which by a diaphragm adjustable by a screw $d$ can be increased or decreased, whereby small corrections in the indication of the manometric may be effected.

Fig. 3 shows another modification to be employed, for instance, for liquids with a variable specific gravity in open tanks. On the surface of a liquid of this kind the height of which is to be gaged floats a receptacle $g$, which is open on the top and made of suitable material—such as glass, metal, stone, or the like—and which is preferably of a flat dish shape. On its bottom a flexible tube or a hose $i$ is attached, being connected to a pressure-transmitter A, which may be placed outside the tank B. This apparatus consists of two parts a and b, which are separated by a flexible diaphragm, with the lower part a of which the float g is connected by the tube i. The space a, tube i, and space g are filled with one of the liquids mentioned above—as, for instance, alcohol—so that this liquid is nearly at the same level as the liquid in B. To the top space b of the receptacle A a narrow tube e is attached, leading to a manometric gage M. The pressure in A is transmitted to M by air, but this may also be done by means of a liquid—as, for instance, oil, alcohol, or the like. c is an adjusting apparatus, in which the diaphragm can be adjusted by a screw-bolt d. By this means the air or liquid inclosed in c is compressed or distended, so that in this way small corrections in the indication of the manometer may be made.

The apparatus works in the following manner: If the liquid-level in B changes, the float g rises or descends, and the liquid column h increases or decreases. In consequence thereof the pressure upon the diaphragm in A increases or decreases, and the manometer indicates the variation of the height H. The graduation of the manometer is such that in each position of the float the corresponding height may be read directly on the gage. If the specific gravity of the liquid in B is changed, the float, all other conditions remaining unchanged, will in consequence thereof dip more or less into the liquid. By making the weight of the float g, with the tube i and its contents, as small and, on the other hand, the cross-section of the float submerging as large as possible it is possible to reduce the differences of the depth to which the float dips into the liquid to such a degree that the deviations of the indications of the manometric gage from the actual proper heights H, caused by different specific gravities of the liquid contained in B, are of substantially no account. The indications of the manometer, as well as the actual liquid-levels, can be portrayed by graduations in a well-known manner.

What I claim, and desire to secure by Letters Patent of the United States, is—

1. A device for indicating the height of liquids comprising the combination with a suitable container for said liquids, a float and a flexible tube disposed in said container and adapted to receive a column of liquid, and means connected to said tube and float for indicating the height of the said column of liquid.

2. A device for indicating the height of liquids, comprising a suitable container for the liquid, a hollow float in said container, a diaphragm and a gage operatively connected to said diaphragm, and tubular connections between said gage and said hollow float and adapted to contain a liquid column.

3. The combination with a diaphragm-chamber, of a float having a tubular connection with said chamber and adapted to carry a liquid column, and a suitable register controllable by said chamber.

4. The combination with a liquid-container, of a hollow float in said container, and a diaphragm-chamber outside of said container, a vent connected to said float and tubular connections between said float and said diaphragm-chamber.

5. In a level-indicating device, the combination with a liquid-container, and an external gage, of a chambered float in said container, a register, a tube connecting the float and register, and another tube connected with the float above the level of liquid to be contained therein.

6. The combination of a manometer having a diaphragm-chamber, another diaphragm-chamber operatively connected therewith, a chambered float, and a flexible tube communicating with the float and the second diaphragm-chamber.

In witness whereof I have hereunto signed my name in the presence of two subscribing witnesses.

CONSTANZ SCHMITZ.

Witnesses:
HENRY HASPER,
WOLDEMAR HAUPT.